US012647277B2

(12) United States Patent  
Venkatesan et al.

(10) Patent No.: US 12,647,277 B2  
(45) Date of Patent: Jun. 2, 2026

(54) DATA DIODE FOR ENHANCING DATA SECURITY

(71) Applicant: Microsoft Technology Licensing, LLC, Redmond, WA (US)

(72) Inventors: Ramarathnam Venkatesan, Redmond, WA (US); Nishanth Chandran, Bangalore (IN); Panagiotis Antonopoulos, Redmond, WA (US); Christoph Berlin, Bellevue, WA (US); Michael James Zwilling, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 269 days.

(21) Appl. No.: 18/326,493

(22) Filed: May 31, 2023

(65) Prior Publication Data

US 2024/0406002 A1 Dec. 5, 2024

(51) Int. Cl.  
*H04L 9/32* (2006.01)

(52) U.S. Cl.  
CPC .................................. *H04L 9/3247* (2013.01)

(58) Field of Classification Search  
None  
See application file for complete search history.

(56) References Cited

U.S. PATENT DOCUMENTS

| | | | | |
|---|---|---|---|---|
| 2016/0283747 | A1* | 9/2016 | Xing ...................... | G06F 21/602 |
| 2018/0013786 | A1* | 1/2018 | Knopf ..................... | H04L 9/321 |
| 2020/0084027 | A1* | 3/2020 | Duchon ................ | G06F 21/602 |
| 2020/0228316 | A1* | 7/2020 | Cahill ................... | H04L 9/3297 |

OTHER PUBLICATIONS

Freitas, et al., "SDN-Enabled Virtual Data Diode", Advances In Databases And Information Systems, 2019, pp. 102-118.  
International Search Report and Written Opinion received for PCT Application No. PCT/US2024/030185, mailed on Sep. 13, 2024, 14 pages.  
Wrona, et al., "Leveraging and Fusing Civil and Military Sensors to support Disaster Relief Operations in Smart Environments", IEEE Military Communications Conference (MILCOM), 2019, pp. 790-797.  
International Preliminary Report on Patentability (Chapter I) received for PCT Application No. PCT/US2024/030185, mailed on Dec. 11, 2025, 07 pages.

* cited by examiner

*Primary Examiner* — Jeffrey C Pwu  
*Assistant Examiner* — Mayasa A. Shaawat

(57) ABSTRACT

Data diode systems and methods are disclosed herein for enhancing data security. Encrypted data transmitted from a first node (e.g., an entity coupled to a network) is received. The data transmitted is encrypted with a public key associated with a second node (e.g., the node to which to which the encrypted data is transmitted). The encrypted data is decrypted with a private key associated with the second node to generate decrypted data. A determination is made whether a digital signature in the decrypted data corresponds to a ledger entry mapped to the first node in a first set of ledger entries. The first node is verified to be a trusted entity based on the digital signature having been determined to correspond to the ledger entry. Based on the verification, the transmission of the encrypted data from the first node is determined to be a permissible data transmission.

20 Claims, 6 Drawing Sheets

100

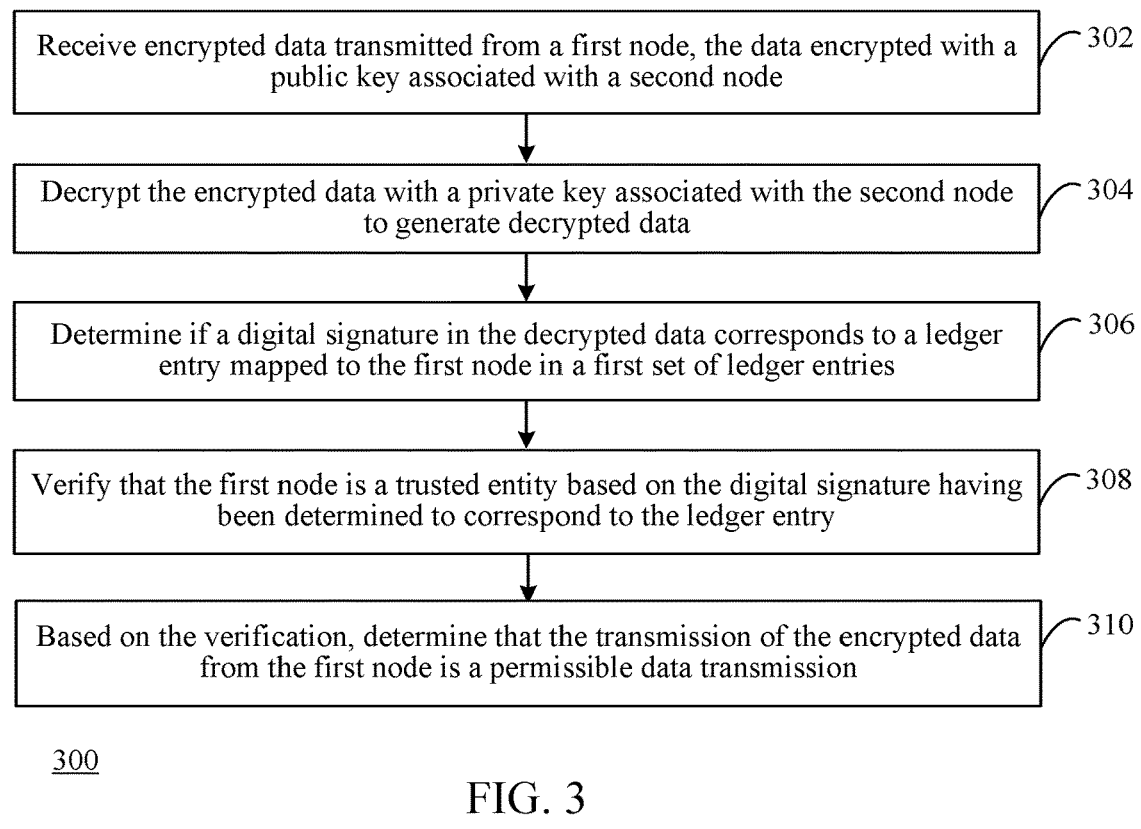

Receive encrypted data transmitted from a first node, the data encrypted with a public key associated with a second node ⌐302

Decrypt the encrypted data with a private key associated with the second node to generate decrypted data ⌐304

Determine if a digital signature in the decrypted data corresponds to a ledger entry mapped to the first node in a first set of ledger entries ⌐306

Verify that the first node is a trusted entity based on the digital signature having been determined to correspond to the ledger entry ⌐308

Based on the verification, determine that the transmission of the encrypted data from the first node is a permissible data transmission ⌐310

Encrypt data with a public key associated with a third node, the public key associated identified from a second set of ledger entries that identifies at least one node to which the second node can securely transmit data ⌐402

Transmit the data encrypted with the public key associated with the third node to the third node ⌐404

Receive, from an administrative entity, an update to the first set of ledger entries that includes at least one of an addition or removal of a node in a listing of nodes ⌐502

Execute a data diode within a secure enclave of a computing device, the computing device including a plurality of secure enclaves that are isolated from each other ⟋602

600

700

| Data Diode Ledger 720 | | |
|---|---|---|
| 722⟍ | 724⟍ | 726⟍ |
| Diode ID | Start Node | End Node |
| Diode 1 | Node A | Node B |
| Diode 2 | Node B | Node A |
| Diode 3 | Node A | Node C |
| o o o | o o o | o o o |

DATA DIODE FOR ENHANCING DATA SECURITY

BACKGROUND

Data security on communication links has become increasingly important. For instance, in some high security environments such as defense environments, different entities coupled to a network comprise differing security classifications Because these environments typically comprise confidential information, ensuring that the network is secure against potentially malicious actors is a high priority. In conventional techniques, air gaps were employed which isolates the network from external environments. However, as the amount of transferable data has increased and a continuous and/or real-time data stream has become more important, air gaps alone became insufficient.

To address these problems, physical devices known as data diodes that implement photodiodes are installed on communication links (e.g., wires) to allow data to travel in a single direction (e.g., from a lower security level entity to a higher security level entity, but not the other way around). While such devices have improved security, these devices are costly and burdensome to install and/or reconfigure.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Data diode systems and methods are disclosed herein for enhancing data security. Encrypted data transmitted from a first node (e.g., an entity coupled to a network) is received. The data transmitted is encrypted with a public key associated with a second node (e.g., the node to which to which the encrypted data is transmitted). The encrypted data is decrypted with a private key associated with the second node to generate decrypted data. A determination is made whether a digital signature in the decrypted data corresponds to a ledger entry mapped to the first node in a first set of ledger entries. The first node is verified to be a trusted entity based on the digital signature having been determined to correspond to the ledger entry in the first set of ledger entries. Based on the verification, the transmission of the encrypted data from the first node is determined to be a permissible data transmission.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 3 shows a flowchart of a method for implementing a data diode, in accordance with an example embodiment.

FIG. 4 shows a flowchart of a method for transmitting data to a third node, in accordance with an example embodiment.

FIG. 5 shows a flowchart of a method for updating a first set of ledger entries, in accordance with an example embodiment.

Figure 1A:
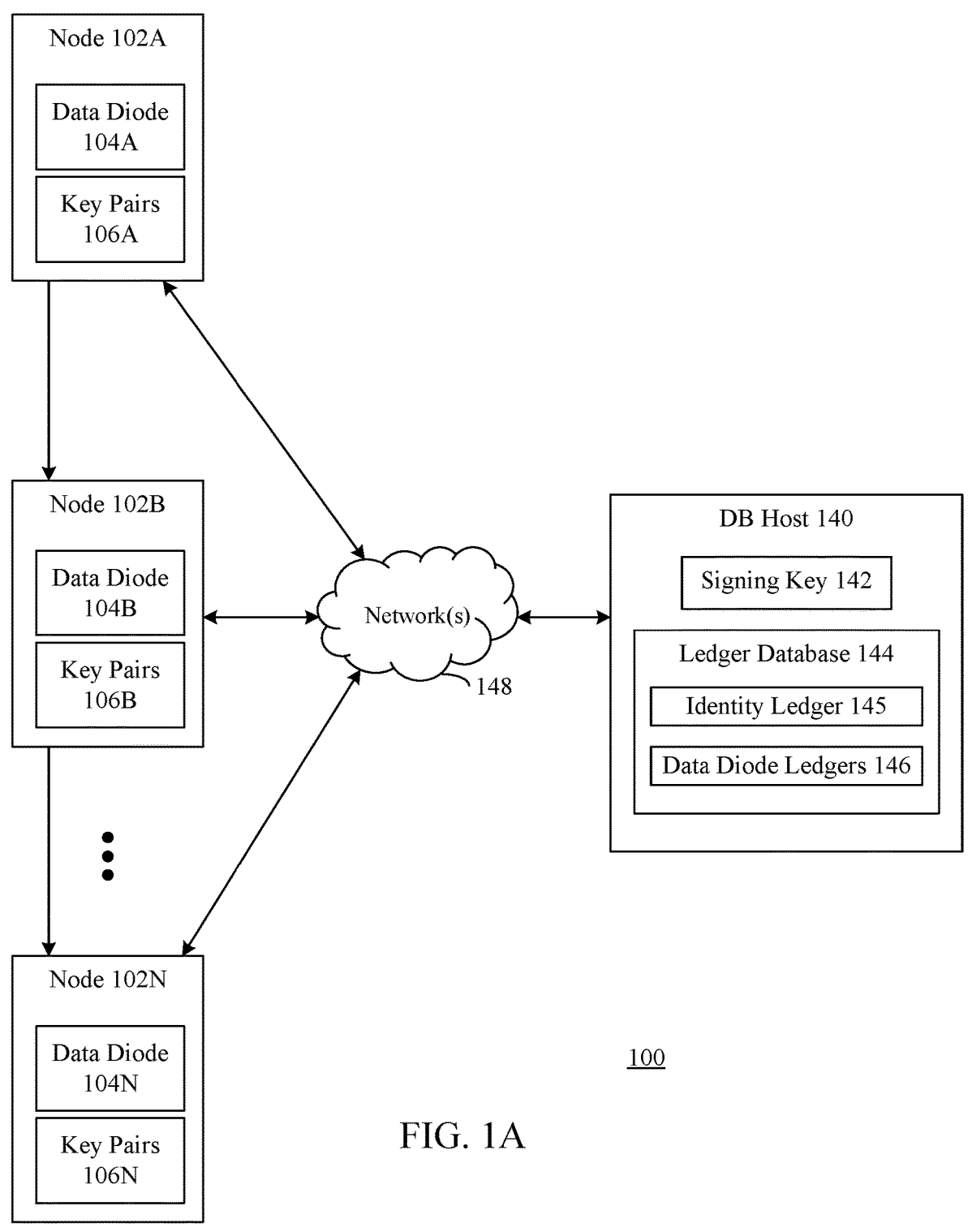
FIG. 1A shows a block diagram of a data diode system, in accordance with an example embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Data security on communication links has become increasingly important. For instance, in some high security environments such as defense environments, different entities coupled to a network comprise differing security classifications Because these environments typically comprise confidential information, ensuring that the network is secure against potentially malicious actors is a high priority. In conventional techniques, air gaps were employed which isolates the network from external environments. However, as the amount of transferable data has increased and a continuous and/or real-time data stream has become more important, air gaps alone became insufficient.

To address these problems, physical devices known as data diodes that implement photodiodes are installed on communication links (e.g., wires) to allow data to travel in a single direction (e.g., from a lower security level entity to a higher security level entity, but not the other way around). While such devices have improved security, these devices are costly and burdensome to install and/or reconfigure. Further, each individual pathway (e.g., in both directions) to be controlled requires installation and/or maintenance of a separate hardware device.

Embodiments described herein are directed to data diodes (e.g., virtual data diodes) for enhancing data security. In example embodiments, the disclosed data diodes may be used to ensure that data is transmitted between nodes in only a single direction. In an example system, encrypted data transmitted from a first node (e.g., an entity coupled to a network) is received. The data transmitted is encrypted with a public key associated with a second node (e.g., the node to which to which the encrypted data is transmitted). The encrypted data is decrypted with a private key associated with the second node to generate decrypted data. A determination is made whether a digital signature in the decrypted data corresponds to a ledger entry mapped to the first node in a first set of ledger entries. The first node is verified to be a trusted entity based on the digital signature having been determined to correspond to the ledger entry in the first set of ledger entries. Based on the verification, the transmission of the encrypted data from the first node is determined to be a permissible data transmission.

The techniques described herein enable data diodes to be implemented in a virtual fashion, which may be used as an alternative to, or in addition to (e.g., separately from) physical data diodes to enhance data security. A ledger of identities and credentials (e.g., public keys), as well as a data diode ledger indicating permissible transmission of data, are maintained in a tamper-evident manner, which is used to enforce a single direction of communications between entities (e.g., nodes of a network) over a communication link. In other words, the ledgers indicate, using the information contained therein, which entities are permitted to communicate with each other and which direction those communications are permitted. For instance, the data diode ledger may indicate that an entity with a lower security level is permitted to transmit information to an entity with a higher security level, but not the other way around. In accordance with such techniques, data diode functionality can be implemented in a secure fashion without the additional hardware required with conventional approaches (e.g., physical data diode devices).

Accordingly, the techniques described herein advantageously provide improvements in other technologies, namely data encryption and security. For instance, by utilizing a ledger with identities and credentials and a data diode ledger as described herein to manage permissible flows of data between network nodes, access to systems coupled to the network by unauthorized entities (e.g., malicious actors) is prevented, thereby maintaining the security of data transmitted between nodes and/or stored on various systems coupled to the network. Furthermore, by permitting only authorized communications between the nodes unauthorized manipulation (e.g., to carry out an attack) of nodes and/or systems on the network can also be prevented, thereby ensuring the proper functioning of those network entities. In this manner, unfettered access to data and/or systems on a network is reduced or even eliminated. By mitigating or eliminating such access to network entities (including limiting the direction of communications that take place on the network), the unnecessary expenditure of compute resources (e.g., central processing units (CPUs), storage devices, memory, power, etc.) associated with such entities is also mitigated. Accordingly, the embodiments described herein also improve the functioning of the computing entity on which such compute resources are utilized/maintained, as such compute resources are conserved as a result from preventing a malicious entity from utilizing such compute resources, e.g., for nefarious purposes.

Furthermore, the techniques described herein advantageously allow for implementation of data diodes for controlling a data flow in a virtual manner, rather than utilizing costly physical data diodes that are burdensome to install and/or reconfigure. By implementing the virtual data diodes in accordance with the disclosed embodiments, physical data diode devices may not be necessary in various environments, thereby allowing for a reduction in hardware that is used to control the directional flow of information between nodes of a network. Thus, not only do the disclosed techniques advantageously improve the utilization of compute resources, these techniques also do so in a manner that does not require the use of conventional physical data diode devices.

Embodiments may be implemented in various ways in various environments. For instance, FIG. 1A shows a block diagram of a data diode system 100, according to an example embodiment. As shown in FIG. 1A, system 100 includes a plurality of nodes 102A-102N and a database (DB) host 140, coupled to one or more networks 148. Each of nodes 102A-102N is any type of processing device, including, but not limited to, a desktop computer, a server, a mobile or handheld device (e.g., a tablet, a personal data assistant (PDA), a smart phone, a laptop, etc.), an Internet-of-Things (IoT) device, or other suitable device mentioned elsewhere herein or otherwise known.

DB host 140 comprises one or more server computers or computing devices, which include one or more distributed or "cloud-based" servers, in embodiments. In embodiments, DB host 140 is associated with, or is a part of, a cloud-based service platform and in some embodiments, DB host 140 comprises an on-premises server(s) in addition to, or in lieu of, cloud-based servers. DB host 140 is configured to host and execute any type of DB server application, such as but not limited to, Azure SQL Database™ from Microsoft Corporation of Redmond, WA. In embodiments, nodes 102A-102N and DB host 140 are communicatively coupled via one or more networks, comprising one or more of local area networks (LANs), wide area networks (WANs), enterprise networks, the Internet, etc., and includes one or more of wired and/or wireless portions.

Nodes, as used herein, includes any entity (which can comprise one or more processing devices) configured to receive and/or transmit information to another entity (e.g., another node), or store information. In some implementations, a node comprises a collector node that collects information from a plurality of other nodes, or a broadcaster node that broadcasts information to a plurality of other nodes. In various embodiments, a node may be assigned a hierarchical level relative to other nodes (e.g., Level 1, Level 2, etc.). In some example implementations, a node comprises (or is coupled to) a device that generates and/or logs information, such as a sensor device that measures and/or observes various types of conditions (e.g., environmental conditions, computer or networking states, etc.). In other example implementations, a node comprises (or is coupled to) a device to be controlled, such as a pump, motor, actuator, machinery, computing device, such that the node is configured to output control signals to control such a device.

As shown in FIG. 1A, DB host 140 comprises a signing key and a ledger database 144. Ledger database 144 comprises an identity ledger 145 and a plurality of data diode ledgers 146. DB host 140 executes ledger database 144 in examples. Ledger database 144 provides tamper-evidence capabilities for database tables of ledger database 144 (e.g., identity ledger 145 and data diode ledgers 146), where one can cryptographically attest to other parties, such as auditors or other parties that the data maintained by the database has not been tampered with. Ledger database 144 protects data from any attacker or high-privileged user, including database administrators, system administrators, and cloud administrators. As with a traditional ledger, historical data is preserved. If a row is updated in a ledger table, its previous value is maintained and protected in a history table. Ledger database 144 provides a chronicle of all changes made to the database over time. In accordance with an embodiment, historical data is maintained in a relational form to support queries (e.g., SQL queries) for auditing, forensics, and other purposes.

In some example implementations, rows modified by a transaction in a ledger table is cryptographically hashed (e.g., SHA-256 hashed) using a data structure, such as a Merkle tree, that creates a root hash representing all rows in the transaction. The transactions that ledger database 144 processes are then also hashed together through a Merkle tree data structure. The result is a root hash that forms a block. The block is then hashed through the root hash of the block, along with the root hash of the previous block as input to the hash function. That hashing forms a blockchain. The root hashes contain the cryptographically hashed transactions and represent the state of the database at the time the digests were generated. In accordance with an embodiment, the digests are periodically generated and stored outside the database in tamper-proof storage.

Ledger database 144 is configured to store and protect any type of data or information, including, but not limited to identity ledger 145 and data diode ledgers 146. Data diode ledgers 146 are configured to store information, for a given node, indicative of which other nodes can transmit data to the given node and/or other nodes to which the given node can transmit data. In examples, data diode ledgers 146 can identify each node using information that uniquely identifies the node (e.g., within the organization). Examples of the node identifier include, but are not limited to, a node name, location, a serial number, network address (e.g., an Internet Protocol (IP) address or a Media Access Control (MAC) address), any other type of information that uniquely identifies the node. In some implementation, such as where the node is a device (e.g., a wearable device, a phone, a sensor, or other computing device) utilized by a user, the node identifier can comprise the user's email address, the user's phone number, the user's username, or any other information that uniquely identifies the user.

In examples, identity ledger 145 is maintained by an organization and comprises a ledger of a plurality of nodes across the organization. In example embodiments, identity ledger 145 is configured to store, for each node, an identification of each node (e.g., using a unique identifier within the organization), a long-term signing key (e.g., a public signing key) of the node in association with the identity of the node. In accordance with an embodiment, identity ledger 145 is also configured to store, for each node, a short-term encryption key (e.g., a public encryption key) of the node, which is further described below.

In examples, each organization maintains and/or publishes their own dada diode ledgers comprising identities and key(s) for nodes of the organization. As such, each organization acts as their own identity or certification authorities. Using the data diode ledgers, each node of the organization can send and/or receive information from certain other nodes in a secure fashion, as further described below.

To initially generate data diode ledgers 146 for a given node, the organization identifies a set of nodes that can transmit information to the given node, and/or set of nodes to which the given node can transmit information. In some implementations, a given node is only permitted to receive information from one or more other nodes. In some other implementations, a given node is only permitted to transmit information to one or more other nodes. In various embodiments, each ledger entry in the data diode ledger indicates whether the node is a permissible node for incoming and/or outgoing data transmissions (e.g., by storing an indicator for each node in the ledger identifying a permitted direction of data transmission). In some examples, the organization also identifies a hierarchical level associated with the given node and/or any other nodes for which communications are permitted (e.g., whether each node is Level 1, Level 2, Level 3, etc.). For each of the identified nodes from which data can be received or transmitted (e.g., as a starting node and/or an ending node), the organization obtains a node identifier and stores the identifiers in the data diode ledger, thereby constructing a table that identifies which nodes may transmit data to which other nodes (or which nodes may receive data from which other nodes). It should be noted that while example embodiments are described herein with respect to the nodes being part of a single organization, the disclosed techniques may also be utilized to control a directional flow of information between nodes across different organizations.

With respect to identity ledger 145, the organization obtains the long-term signing keys associated with those identifiers and stores the long-term signing keys in a column of the identity ledger configured to store long-term signing keys. The organization also obtains the short-term encryption keys associated with those identifiers and stores the short-term encryption keys in a column of the identity ledger configured to store short-term encryption keys. The organization then signs the data diode ledgers and the identity ledger using its own private signing key 142. The generated data diode ledgers and identity ledger are considered to be trusted and verifiable, as the binding between respective identifier and keys is signed by the private signing key of the organization and is verifiable (e.g., by each data diode as described in detail below) using the public signing key corresponding to the private signing key of the organization. Signing each ledger using signing key 142 in such a manner prevents an adverse party (e.g., a malicious actor) from providing a tampered ledger to a node in an attempt to initiate an attack.

While information in identity ledger 145 and/or data diode ledgers 146 may be accessible to entities (e.g., information stored in identity ledger 145 and data diode ledgers 146 is not private), information stored therein cannot be modified by individual users. In one implementation, identity ledger 145 and data diode ledgers 146 comprise ledger tables in Microsoft Structured Query Language (SQL) Server.

In accordance with an embodiment, the long-term signing keys collected for the nodes are stored on and/or obtained from nodes 102A-102N. For instance, as shown in FIG. 1A, each of nodes 102A-102N stores a respective a key pair 106A-106N, which includes a long-term private signing key and a long-term public signing key. The long-term signing key pairs 106A-106N are generated by a trusted or customer-controlled service. Each of long-term signing key pairs 106A-106N comprises randomly-generated numbers (e.g., the service comprises a random number generator that generates long-term signing key pairs 106A-106N). In accordance with an embodiment, the service executes locally on each of nodes 102A-102N. In accordance with another embodiment, the service executes remotely from nodes 102A-102N. In accordance with such an embodiment, long-term signing key pairs 106A-106N are generated from a key generating service, where nodes 102A-102N submit a request to the service for a long-term key pair. Responsive to receiving the request, the service generates (e.g., randomly) the long-term key pair and provides the generated key pair to the requesting computing device via a response. In accordance with an embodiment, the service is a Proof of Possession (PoP)-based service; although it is noted that the embodiments described herein are not so limited.

In examples, the long-term private signing key of pairs 106A-106N are respectively stored locally in a secure environment of each of nodes 102A-102N. Examples of a secure environment include, but are not limited to, a trusted platform module (TPM), a hardware security module (HSM), or any type of secure hardware and/or software-based cryptoprocessor. In other examples, the key pairs may be stored in one or more secure enclaves that are coupled to one or more nodes.

Ledger database 144 is configured to provide nodes 102A-102N access to identity ledger 145 and data diode ledgers 146, which indicates the identity of nodes across an organization and the communications that are permissible for each node. For example, node 102A may comprise a first set of data diode ledgers associated therewith, node 102B may comprise a second set of data diode ledgers therewith, and so on. In implementations, the diode ledgers for each of the nodes may be different from each other, as each ledger contains the identities of other nodes that can communicate with a given node. It is noted that in embodiments, ledger database 144 is configured to provide nodes with updates to data diode ledgers, in the permissible communications for a given node changes over time. In examples, each data diode ledger comprises a set of data diode ledger entries, each entry identifying another node from which communications may be received and/or to which communications may be transmitted. Thus, as used herein, a data diode ledger also refers to a set of data diode ledger entries. A given set of data diode ledger entries may be arranged in a single data diode ledger (e.g., a single data diode ledger that identifies communications to/from a plurality of nodes) and/or across multiple data diode ledgers (e.g., one or more data diode ledgers for a given node).

In various implementations, key pairs 106A-106N also include a public signing key corresponding to signing key 142, such that each node may use the public signing key to confirm that identity ledger 145 and data diode ledgers associated therewith have not been tampered with. For instance, where the identity ledger and each data diode ledger is signed with a private signing key of an administrative entity (e.g., signing key 142), each data diode of each node may verify (e.g., at periodic intervals, with each data transmission, and/or each time a new or updated ledger is obtained) that each ledger is trusted by using the public signing key corresponding to the private signing key. In various other implementations, key pairs 106A-106N also include short-term encryption key pair (e.g., a public short-term encryption key and a private short-term encryption key).

In embodiments, data diodes 104A-104N are configured to access ledgers associated with a given node to determine whether communications (e.g., incoming and/or outgoing) are permissible. In an example, node 102A may only comprise a ledger identifying other nodes that node 102A may send data to. In other words, node 102A may not comprise a ledger that identifies any other nodes from which information is permitted to be received. When a communication is directed to node 102A, data diode 104A may attempt to locate the node in an appropriate ledger and determine that such a communication is not permissible as a result of an absence of such a ledger. In another example, when transmitting a communication from node 102A, data diode 104 may determine whether an intended recipient node is present in a ledger for which transmissions are permitted. If the transmission is permitted, data diode 104A may sign and/or encrypt the transmission, and provide the transmission to the intended recipient node. If the intended recipient node is not a permitted recipient of information from node 102A, data diode 104A may prevent the transmission therefrom. Similar techniques may be employed for each of nodes 102A-102N, thereby ensuring that communications between permitted nodes take place.

Figure 1B:
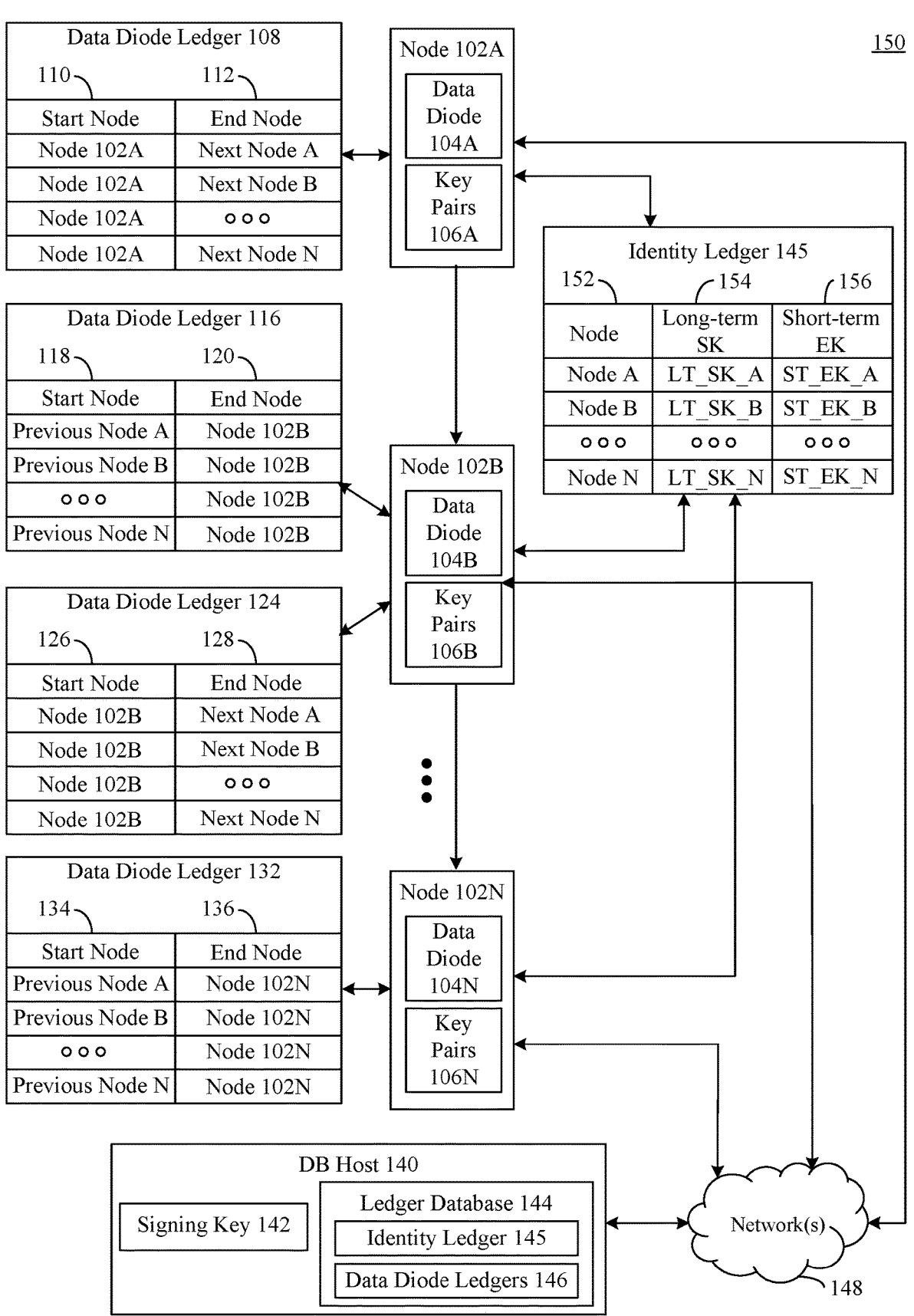
FIG. 1B shows a block diagram of another data diode system, in accordance with an example embodiment.

FIG. 1B shows a block diagram of another data diode system 150, according to an example embodiment. In examples, system 150 is an example implementation of system 100. As shown in FIG. 1B, system 150 includes a plurality of nodes 102A-102N and a DB host 140, coupled to one or more networks 148. In FIG. 1B, node 102A is configured to access (remotely or locally) a data diode ledger 108. Node 102B is configured to access a data diode ledger 116 and a data diode ledger 124. Node 102N is configured to access a data diode ledger 132. Each of data diodes 104A-104N access respective data diode ledgers associated with each of nodes 102A-102N to determine whether each incoming and/or outgoing communication of data is permissible. In examples, each of nodes 102A-102N also access identity ledger 145, as shown in FIG. 1B.

In examples, each data diode ledger comprises a plurality of rows and/or columns. In an illustrative example shown in FIG. 1B, each data diode ledger comprises a column that identifies a start node (e.g., a node from which a data transmission can originate) and a column that identifies an end node (e.g., a node to which the data can be transmitted). For instance, data diode ledger 108 comprises a column 110 that identifies a starting node (node 102A in this illustration) and a column 112 that identifies an ending node (e.g., next nodes, or other nodes to which node 102A may transmit data). Data diode ledger 116 comprises a column 118 that identifies a start node (e.g., previous nodes, or other nodes from which node 102B may receive data) and a column 120 that identifies an end node (node 102B in this illustration). Data diode ledger 124 comprises a column 126 that identifies a starting node (node 102B in this illustration) and a column 128 that identifies an ending node (e.g., next nodes, or other nodes to which node 102B may transmit data). Data diode ledger 132 comprises a column 134 that identifies a starting node (e.g., previous nodes, or other nodes from which node 102N may receive data) and a column 136 that identifies an ending node (node 102N in this illustration). It should be understood that while each data diode ledger shown in FIG. 1B comprises two columns, a single column may be implemented in some examples. For instance, for a given node, a data diode ledger may comprise a single column that indicate each node to which outgoing transmissions are permitted. In another example, for a given node, a data diode ledger may comprise a single column that indicates each node from which incoming transmissions are permitted. In some other implementations, a single ledger may be utilized to indicate each node to which outgoing transmissions are permitted and each node from which incoming transmissions are permitted.

Identity ledger 145 comprises a column 152 for a node identifier, a column 154 for an associated long-term signing key, and a column 156 for an associated short-term encryption key. While identity ledger 145 and data diode ledgers 108, 116, 124, and 132 are shown as separate, any one or more of the entries contained in these ledgers (as well as other ledgers described herein but not expressly illustrated) may be combined or grouped in a single ledger.

As shown in FIG. 1B, node 102A does not comprise any data diode ledger entries that indicate that node 102A can receive information (e.g., entries that identify previous nodes), indicating that communications from other nodes to node 102A are not permitted. Similarly, node 102N does not comprise any data diode ledger entries that indicate that node 102N can transmit information (e.g., entries that identify next nodes), indicating that communications to other nodes from node 102N are not permitted. Data diodes 104A and data diode 104N are configured to enforce such communication restrictions based on the absence of such ledger entries. In other examples, such as where a given node receives data from another node that is not listed as a start node in an associated ledger (e.g., node 102B receives data from a node that is not identified in data diode ledger 116 as a start node), data diode 104B may indicate that such transmission is not permissible and take any appropriate measures (e.g., blocking the transmission, deleting the transmission, providing a notification to an administrator or security platform, etc.). In a similar fashion, if node 102B attempts to transmit data to a node that is not listed in data diode ledger 124 as an end node, data diode 104B may indicate that this transmission is not permissible and take appropriate measures in response. Such attempted data transmissions may occur as a result of the actions of a malicious actor, or due to benign or other unintended activities (e.g., a software issue on a node that results in an unintentional transmission of information). In these instances, the transmissions may be prevented, thereby preventing nodes from receiving information that is not intended to be received. In this manner, data diodes 104A-104N may enforce the manner in which communications between nodes take place, including the directions of those communications.

Figures 6, 7A, 7B:
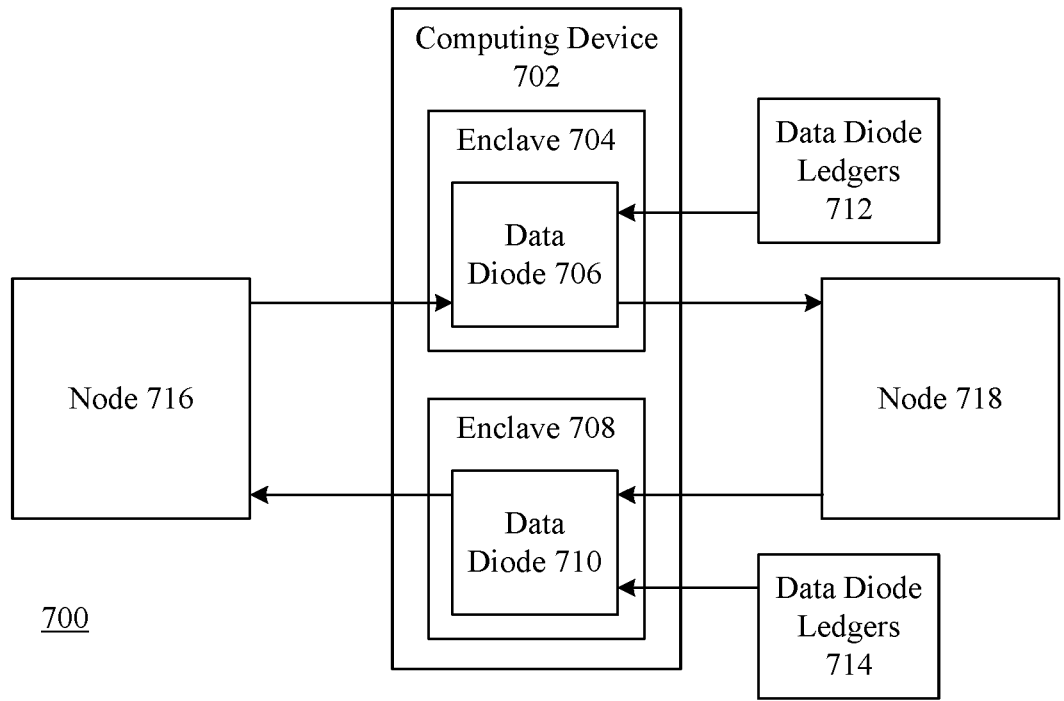
FIG. 6 shows a flowchart of a method for executing a data diode in an enclave, in accordance with an example embodiment.
FIG. 7A shows a block diagram of a data diode system executing in an enclave, in accordance with an example embodiment.
FIG. 7B shows an illustrative data diode ledger, in accordance with an example embodiment.

It should be understood that the examples illustrated herein are only meant to be illustrative. For instance, a data diode ledger may identify only a single node with which communications are permitted, may identify a plurality of such nodes, or identify zero of such nodes. In addition, the data diode ledgers may comprise any suitable structure or arrangement. In some implementations, the data diode ledgers for previous nodes and next nodes are combined in a single ledger. In some further implementations, the data diode ledgers for a plurality of different nodes, or even all nodes, are combined in a single ledger. An example of a ledger combining information for a plurality of nodes is shown in FIG. 7B. In other implementations, the data diode ledgers for each node are separated based on a directional path (e.g., a set of data diode ledgers that identifies previous nodes and a set of data diode ledgers that identifies next nodes). In yet other implementations, the data diode ledgers for each node are separated based on the hierarchy of nodes (e.g., a first set of data diode ledgers for nodes at the same level as a given node, a second set of data diode ledgers for nodes at a lower hierarchical level than the given node, and/or a third set of data diode ledgers for nodes at a higher hierarchical level than the given node). Advantages of separating the ledger (e.g., by directional path and/or by hierarchical level) allow for implementing separate data diodes (each corresponding to a particular set of data diode ledgers for a given node) in a separate enclave of a computing device, thereby further reducing the effects of a malicious actor's attempted access (e.g., by reducing side-channel attacks).

Figure 2:
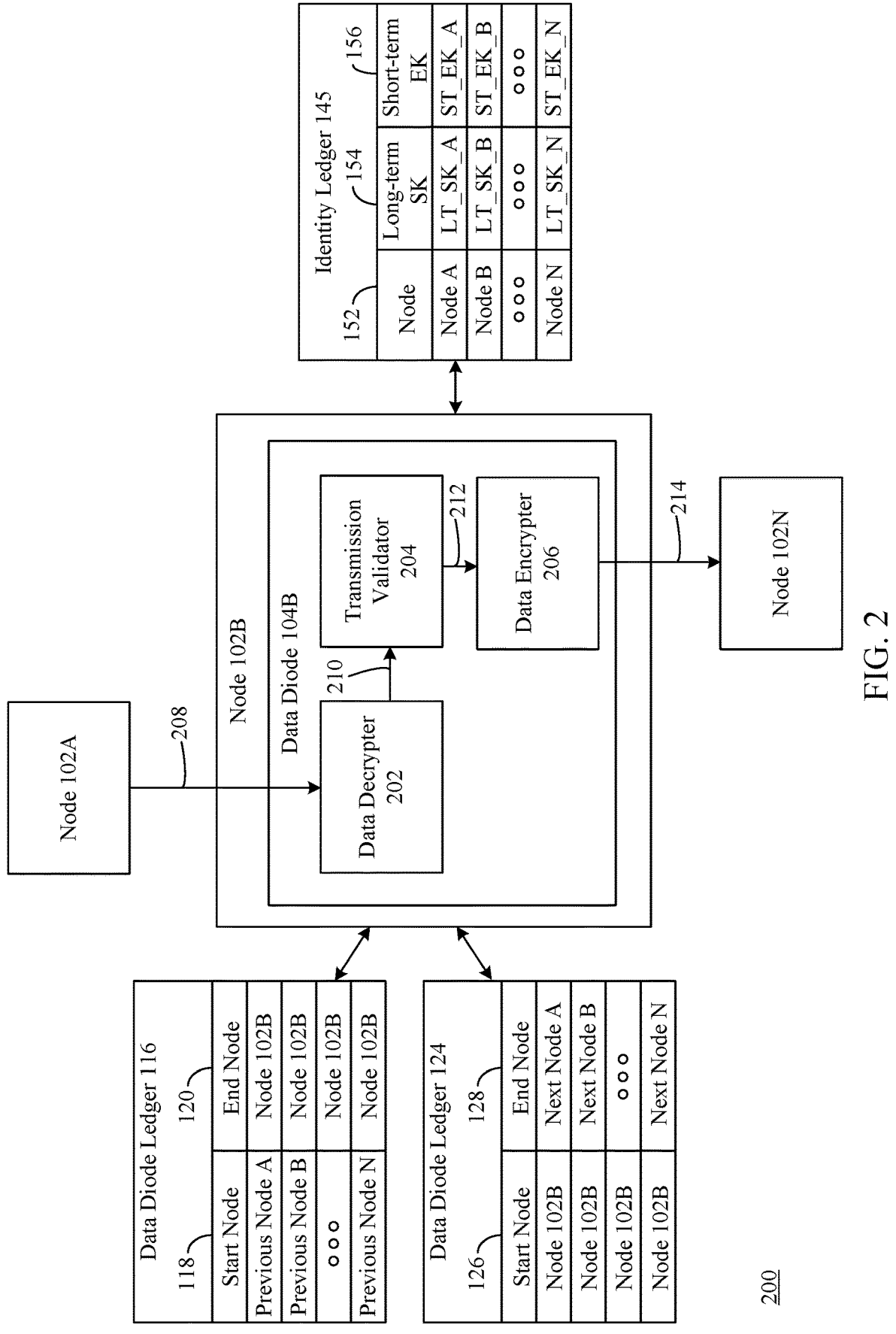
FIG. 2 depicts a block diagram of another data diode system, in accordance with an embodiment.

FIG. 2 depicts a block diagram of another data diode system 200 in accordance with an embodiment. As shown in FIG. 2, system 200 includes an example implementation of node 102A, node 102B, and node 102N. Node 102B is associated with an example implementation of data diode ledger 116 and data diode ledger 124. Node 102B also accesses an example implementation of identity ledger 145. Node 102B comprises an example implementation of data diode 104B. Data diode 104B comprises a data decrypter 202, a transmission validator 204, and a data encrypter 206. Data diode ledger 116 and/or data diode ledger 124 may be stored locally to node 102B and/or may be stored remotely (e.g., on a server such as DB host 140 or other computing device). In some implementations, one or more of node 102A, node 102B, or node 102N may be local to each other (e.g., in a single warehouse, facility, building, etc.). In other implementations, one or more of node 102A, node 102B, or node 102N may be remotely located from each other (e.g., as different nodes of an organization that are located in different geographic regions).

While FIG. 2 (and other further embodiments described herein) is described as an example in which the node 102B receives a set of information from node 102A and/or transmits a set of information to node 102N, such an example is not intended to be limiting. Rather, the techniques described with respect to the example of FIG. 2 are intended to illustrate the manner in which a data diode may be implemented on any node and/or within another device (e.g., in an enclave of a computing device) to control the permissible flow of information between a collection of nodes. For instance, node 102A and/or node 102N (or any other nodes not expressly illustrated) may contain a similar data diode as data diode 104B, and access a respective set of data diode ledgers, to indicate whether incoming and/or outgoing communications are permissible.

Data decrypter 202 is configured to receive encrypted data 208 from node 102A and decrypt the received data. In examples, data transmitted by node 102A is encrypted with an encryption key (e.g., a public encryption key) corresponding to node 102B. Data decrypter 202 decrypts the incoming data using a private key of node 102B corresponding to the public encryption key.

Transmission validator 204 is configured to determine whether the data received from node 102A is authentic. For instance, transmission validator 204 uses the long-term signing key corresponding to node 102A (e.g., obtained from identity ledger 145) to validate whether a digital signature in the received data indicates that the data indeed originated from node 102A (as opposed to a malicious actor or another node). In examples, transmission validator then determines whether node 102A (if the transmission indeed originated from node 102A) is identified in data diode ledger 116 as a previous or starting node. If node 102A is identified in data diode ledger 116 as a previous node in which communications may be received, a determination is made that the communication is permissible. If node 102A is not identified in data diode ledger 116 as a previous node, the received data is not a permissible communication. For such a scenario, the communication is blocked, deleted, and/or prevented from further transmission via node 102B.

Data encrypter 206 is configured to prepare data for transmission to a subsequent node, such as node 102N. In examples, data encrypter 206 signs the data with a signing key associated with node 102B. Data encrypter 206 is also configured to encrypt the data prior to transmission to node 102N. For instance, data encrypter 206 identifies node 102N from a list of nodes in data diode ledger 124 that identifies permissible end nodes or outgoing nodes. Upon identifying the intended recipient (i.e., node 102N), data encrypter 206 obtains the short-term encryption key corresponding to node 102N from identity ledger 145. Data encrypter 206 may then transmit encrypted data 214 (encrypted with the key of node 102N) to node 102N, after which a data diode of node 102N may perform a similar procedure with respect to incoming data.

In another example, a communication session between two or more nodes (e.g., communications from node 102A to node 102N) may utilize a symmetric encryption key ($K_S$) for encryption. In such an example, node 102A may generate the key $K_S$, encrypt the key $K_S$ with a public key associated with node 102N, and transmit the encrypted key to node 102N. Node 102N, upon receipt of the encrypted key, may utilize a private key associated with node 102N to generate the decrypted key $K_S$. Following such a process, subsequent communications between node 102A and node 102N during a given session (or across multiple sessions) may be performed by encrypting communications with key $K_S$, which can provide additional efficiencies over encrypting communications with a public key in some embodiments.

In this manner, data diode 104B may determine whether incoming data is permitted to be received, and whether outgoing data is permitted to be transmitted. By implementing a virtual diode in this manner, directional transmissions of data can be controlled in a desired manner, thereby mitigating the effects of intrusions by malicious actors. Even if a malicious actor were to attempt to modify one of the data diode ledgers, such an attempt would be prevented by virtue of the ledgers being maintained in a tamper-evident manner (e.g., in a blockchain), which cannot be cryptographically broken in an undetected manner in example embodiments. Tampering of the ledgers can be detected in accordance with the disclosed techniques, and if such tampering is detected, the tampered ledgers can be restored in various ways (e.g., from a backup copy, recreated by an organization that owns and/or manages the ledgers, etc.).

In accordance with one or more embodiments, data diodes may be implemented in various scenarios to enhance data security. For example, FIG. 3 shows a flowchart 300 of a method for implementing a data diode, in accordance with an example embodiment. In an embodiment, flowchart 300 is implemented by system 100 as shown in FIG. 1A, system 150 as shown in FIG. 1B, and/or system 200 as shown in FIG. 2. Accordingly, flowchart 300 will be described with reference to FIGS. 1A, 1B, and 2. Other structural and operational embodiments will be apparent to persons skilled in the relevant art(s) based on the following discussion regarding flowchart 300, system 100 of FIG. 1A, system 150 of FIG. 1B, and system 200 of FIG. 2.

Flowchart 300 begins with step 302. In step 302, encrypted data transmitted from a first node is received, where the data is encrypted with a public key associated with a second node. For instance, with reference to FIG. 2, data decrypter 202 is configured to receive encrypted data from node 102A. In implementations, node 102A encrypts the data with a data encrypter (e.g., similar to data encrypter 206). In examples, the encrypted data received from node 102A is encrypted with a public key associated with node 102B. For instance, the public key comprises a public encryption key associated with node 102B that is provided to node 102A (e.g., by node 102B, by DB hose 140, or by another entity).

In some implementations, node 102A may identify the public key from a ledger (e.g., identity ledger 145). For example, data diode 104A of node 102A may identify node 102B as a node for which data transmissions are permitted using data diode ledger 108, and identify an encryption key (e.g., a short-term encryption key from column 156) corresponding to node 102B using identity ledger 145. In various embodiments, data diode 104A also signs the data prior to transmission using a signing key (e.g., a public signing key) known to node 102A. In one example, data diode 104A signs the data prior to encryption. In another example, data diode 104A encrypts the data prior to signing.

In step 304, the encrypted data is decrypted with a private key associated with the second node to generate decrypted data. For instance, with reference to FIG. 2, data decrypter 202 decrypts the received encrypted data with a private key associated with node 102B to generate decrypted data 210. In various embodiments, the private key associated with node 102B comprises a private encryption key that is paired with the public encryption key used by node 102A to encrypt the data. By applying the private encryption key and the received encrypted data to a decryption algorithm, data decrypter 202 generates decrypted data.

In some implementations, if the data received from node 102A is not encrypted, data diode 104B may be configured to identify the transmission as an impermissible data transmission. For example, communications between nodes 102A-102N may be designed such that these communications are encrypted (e.g., in high-security environments). Where an attempted attacker seeks to breach one of the nodes and/or communications paths to transmit data in an unencrypted manner, data decrypter 202 may automatically determine, based on receiving unencrypted information from node 102A, that the transmission is potentially malicious and therefore take one or more preventative measures (e.g., discard the transmission, provide a notification to a security entity or platform, etc.). Similarly, if data decrypter 202 is unable to decrypt a received transmission using a key (e.g., private key) associated with node 102B, data decrypter 202 may similarly determine that the transmission is potentially malicious and take one or more preventative actions.

In step 306, a determination is made if a digital signature in the decrypted data corresponds to an entry mapped to the first node in a first set of ledger entries. For instance, transmission validator 204 is configured to receive decrypted data 210 and determine if a digital signature in the decrypted data corresponds to an entry mapped to the first node in data diode ledger 116 (which comprises a set of ledger entries that identify nodes from which data transmission are permitted). In various embodiments, transmission validator 204 may determine whether data may be received from a given node based at least in part on directional information contained in the data diode ledgers (e.g., in columns 118 and 120). As noted above, in various implementations, node 102A is configured to use a signing key (e.g., a public signing key) to digitally sign the data transmission in order to validate that the transmitted data came from node 102A. In examples, transmission validator 204 applies the received signature information and a signing key (e.g., a private signing key obtained from identity ledger 145 corresponding to node 102A) to a signature verification algorithm to determine if the digital signature indicates that the transmission was provided by node 102A (as opposed to another entity).

In implementations, if transmission validator is unable to identify node 102A as an entity in identity ledger 145 or otherwise cannot validate the digital signature (e.g., the signing key obtained from identity ledger 145 does not correspond to the received digital signature, or no signature was received), transmission validator 204 may determine that the transmission is potentially malicious and take one or more preventative measures, similar to those discussed elsewhere herein. If transmission validator 204 determines that the signature does correspond to a given node (e.g., node 102A) using identity ledger 145, transmission validator 204 determines whether the node (based at least on the digital signature information) is identified in an entry of data diode ledger 116. If the node (e.g., node 102A) is not identified as a node from which incoming transmissions are permitted, transmission validator 204 may determine that the transmission is potentially malicious and take one or more preventative measures, as described herein. In this manner, if data diode 104B receives a transmission of information from a node other than those specifically identified in data diode ledger 116 (e.g., from a malicious entity), such a transmission may be readily identified as malicious and prevented from further transmission.

In step 308, first node is verified to be a trusted entity based on the digital signature having been determined to correspond to the ledger entry. For instance, with reference to FIG. 2, transmission validator 204 determines that node 102A is a trusted entity based on the digital signature having been determined to correspond to an entry in data diode ledger 116. In other words, based on verification of the digital signature received in the transmission from node 102A, and a determination that the signature corresponds to an entry in the tamper-evident data diode ledger 116, it can be validated that the transmission was received from node 102A and that node 102A is one of the nodes from which transmissions are permitted.

In step 310, based on the verification, it is determined that the transmission of the encrypted data from the first node is a permissible data transmission. For instance, with reference to FIG. 2, transmission validator 204 determines that the transmission of the encrypted data received from node 102A is a permissible data transmission based on the verification. Because node 102A was identified as one of the nodes from which transmissions are permitted and it was also verified that the received transmission was provided by node 102A (e.g., based on the signature), the transmission is identified as a permissible transmission of data.

In this manner, each data transmission from one node to another node can be managed such that only certain types of communications are permitted (e.g., based on which nodes are allowed to receive data, which nodes are allowed to send data, etc.). As a result, not only do the disclosed techniques enable a fine-grained ability to identify which nodes can communicate with each other, these techniques also allow for which directions those communications may take place. Such techniques can enhance data security of individual nodes and/or an overall system of nodes, such as by ensuring that confidential sensitive information propagates only from lower-security nodes to higher-security nodes. In addition, these techniques also minimize the ability for nefarious actors to infiltrate a network of nodes in an attempt to initiate communications. Such attempted communications can be readily identified and/or blocked in accordance with the disclosed embodiments.

In accordance with one or more embodiments, information received by one node may be subsequently transmitted to another node. For instance, while the previous example describes instances where a receiving node receives information from a transmitting node, techniques described herein may also be implemented to enable a transmitting node to securely transmit information to one or more other nodes. For example, FIG. 4 shows a flowchart 400 of a method for transmitting data to a third node, in accordance with an example embodiment. In an embodiment, flowchart 400 is implemented by system 100 as shown in FIG. 1A, system 150 as shown in FIG. 1B, and/or system 200 as shown in FIG. 2. Accordingly, flowchart 400 will be described with reference to FIGS. 1A, 1B, and 2. Other structural and operational embodiments will be apparent to persons skilled in the relevant art(s) based on the following discussion regarding flowchart 400, system 100 of FIG. 1A, system 150 of FIG. 1B, and system 200 of FIG. 2.

Flowchart 400 begins with step 402. In step 402, data is encrypted with a public key associated with a third node, where the public key associated with the third node is identified from a second set of ledger entries that identifies at least one node to which the second node can securely transmit data. For instance, with reference to FIG. 2, data encrypter 206 is configured to obtain data 214 and (e.g., data that is to be transmitted to another node) and identify a public key corresponding to an intended recipient of the data. In examples, the intended recipient is one of the nodes identified in data diode ledger 124, which identifies one or more nodes that node 102B may securely transmit data. In various other embodiments, the intended recipient is identified based at least on a determination that node 102B may transmit outgoing data to the intended recipient using information contained in the ledger. In this manner, node 102B may transmit data only to those entities listed in data diode ledger 124, while preventing transmission of data to other nodes not listed as a permissible recipient. When an intended recipient of the data is identified (i.e., a specific node in data diode ledger 124), an encryption key corresponding to the intended recipient node is obtained. In implementations, the encryption key comprises a short-term encryption key corresponding to the node in a ledger (e.g., a key in column 156). In another implementation, the encryption key may be obtained from the intended recipient node, from DB host 140, or from another entity.

In step 404, the data encrypted with the public key associated with the third node is transmitted to the third node. For instance, with reference to FIG. 2, data encrypter 206 may be configured to transmit the data encrypted with the public key to node 102N (or another node that is indicative of the intended recipient of the data). When node 102N receives the encrypted data, a data diode on node 102N (similar to data diode 104B) implements similar techniques as described herein to decrypt the information, verify if the information was transmitted from node 102B, and verify if node 102B is identified on a data diode ledger indicating that node 102B is permitted to transmit information to node 102N. Similar techniques may be implemented across various nodes in a network or organization to ensure a uni-directional communication between specified nodes and improve overall security.

It should be understood that while flowchart 400 illustrates node 102B transferring data that it received from node 102A (e.g., where node 102B acts as an intermediary), implementations are not so limited. Similar techniques may be applied where node 102B is a first transmitter of the data (e.g., the data is generated by node 102B or local to 102B), or node 102B is a first level node in a hierarchy of node levels. In a further implementation, one or more of the techniques described in accordance with flowchart 400 may be used when information is transmitted between three or more nodes (e.g., where one or more nodes acts as an intermediary). In such implementations, an additional and/or alternative encryption and/or signing technique may be used. For instance, the data may be encrypted using an encryption key of the node that is permitted to view the transmitted information (which may be different than the intermediary nodes, if such nodes are not allowed to access the transmitted information). In another example, additional and/or alternative signing protocols may be employed such that the final recipient may verify that the transmitted information originated from a given node and was not tampered with by any other node during transmission.

In accordance with one or more embodiments, virtual data diodes as described herein may be updated periodically. For example, FIG. 5 shows a flowchart 500 of a method for updating a first set of ledger entries, in accordance with an example embodiment. In an embodiment, flowchart 500 is implemented by system 100 as shown in FIG. 1A, system 150 as shown in FIG. 1B, and/or system 200 as shown in FIG. 2. Accordingly, flowchart 500 will be described with reference to FIGS. 1A, 1B, and 2. Other structural and operational embodiments will be apparent to persons skilled in the relevant art(s) based on the following discussion regarding flowchart 500, system 100 of FIG. 1A, system 150 of FIG. 1B, and system 200 of FIG. 2.

Flowchart 500 begins with step 502. In step 502, an update to the first set of ledger entries that includes at least one of an addition or removal of a node in a listing of nodes is received from an administrative entity. For instance, with reference to FIG. 1B, DB host 140 may update one or more of identity ledger 145 and/or data diode ledgers 146. The update can include any change to the information stored in any of the nodes' respective data diode ledgers, including but not limited to, an additional of a node, a removal of a node, a change to a long-term signing key, a change to a short-term encryption key, additional or removal of a ledger, or any other change. In implementations, the update is performed in a tamper-evident manner (e.g., using a block-chain technique). In various embodiments, DB host 140 signs the updated ledger(s) with signing key 142.

Upon generating updated data diode ledger(s), DB host 140 transmits the data diode ledgers (or otherwise makes those ledgers available) to each of the respective nodes coupled to network 148. When a particular node receives an updated ledger, the data diode within such a node may verify that the updated ledger is authentic (i.e., it was signed by signing key 142), and utilize the information contained in the updated data diode ledger to identify whether communications to and/or from the node are permissible in accordance with the disclosed techniques. For instance, if node 102B receives an update to data diode ledger 116 and/or data diode ledger 124 to add or remove a node in a listing of nodes contained therein, data diode 104B may be configured to manage incoming and/or outgoing communications of node 102B based on the addition and/or removal of the node. In this manner, updates to data diodes may be performed via updating a respective data diode ledger, which is advantageous over other techniques (e.g., physical data diode devices that used photosensors or air gaps) in which physical data diodes need to be physically reconfigured, added, removed, or otherwise rewired. The disclosed embodiments enable changes to virtual data diodes in a more efficient manner, allowing changes to data controls (which can affect data security and utilization of compute resources) to take place quicker.

In examples, data diodes as described herein can be implemented in various ways and/or in various types of hardware devices. For example, FIG. 6 shows a flowchart 600 of a method for executing a data diode in an enclave, in accordance with an example embodiment. In an embodiment, flowchart 600 is implemented by system 100 as shown in FIG. 1A, system 150 as shown in FIG. 1B, system 200 as shown in FIG. 2, and/or a system 700 as shown in FIG. 7A. Accordingly, flowchart 600 will be described with reference to FIGS. 1A, 1B, and 2. Accordingly, flowchart 600 will be described with reference to FIGS. 1A, 1B, 2, and 7. FIG. 7A shows a block diagram of a data diode system 700 executing in an enclave, in accordance with an example embodiment. As shown in FIG. 7A, system 700 comprises a computing device 702, a set of data diode ledgers 712, a set of data diode ledgers 714, a node 716, and a node 718. Computing device 702 comprises an enclave 704 and an enclave 708. Enclave 704 comprises a data diode 706. Enclave 708 comprises a data diode 710. Node 716 and node 718 are examples of nodes 102A-102N. Data diode 706 and data diode 710 are examples of data diodes 104A-104N. Data diode ledgers 712 and data diode ledgers 714 are examples of data diode ledger 108, data diode ledger 116, data diode ledger 124, and/or data diode ledger 132. Although not illustrated, each of data diode 706 and data diode 710 may access identity ledger 145, in accordance with disclosed techniques.

In accordance with an embodiment, enclave 704 and enclave 708 are implemented in separate secure enclaves of a hardware computing device 702. In accordance with another embodiment, enclave 704 and enclave 708 are implemented in separate computing devices. In accordance with yet another embodiment, computing device 702 comprises a plurality of additional secure enclaves (not shown), each comprising a data diode for controlling the flow of communications between a plurality of additional nodes (not shown). Other structural and operational embodiments will be apparent to persons skilled in the relevant art(s) based on the following discussion regarding flowchart 600, system 100 of FIG. 1A, system 150 of FIG. 1B, system 200 of FIG. 2, and system 700 of FIG. 7A.

Flowchart 600 begins with step 602. In step 602, a data diode is executed within a secure enclave of a computing device, where the computing device includes a plurality of secure enclaves that are isolated from each other. For instance, with reference to FIG. 7A, data diode 706 is executed within enclave 704, and data diode 710 is executed within enclave 708. Both enclave 704 and enclave 708 comprise secure enclaves of hardware computing device 702. In implementations, enclave 704 and enclave 708 are isolated from each other. For instance, enclave 704 comprises an operating environment (e.g., an operating system, applications, etc.) that is not shared with enclave 708 and vice versa. In some implementations, enclave 704 may utilize common resources of computing device 702, such as a processor, memory, etc. However, each enclave is segregated from each other enclave of computing device 702, such that actions performed in one enclave (e.g., data transmissions, processes, application executions, etc.) are not visible or accessible in another enclave. In other words, enclaves of computing device 702 are not able to communicate, or otherwise transfer data, between each other directly, in various embodiments. In this manner, a single computing device may comprise several distinct operating environments, each of which is isolated from one another in a secure fashion (e.g., by preventing lateral movement or side-channel attacks).

In example embodiments, all network communications between nodes that may communicate with each other is controlled by one or more entities that implement the techniques described herein (e.g., based on program code or the like), such that network communications flow through an appropriate data diode. For instance, enclave 704 is implemented such that it intercepts all network traffic from node 716, and enclave 708 is implemented such that it intercepts all network traffic from node 718. Similarly, enclave 708 is implemented such that it intercepts all network traffic (e.g., from any other node) that is to be transmitted to node 716, and enclave 704 is implemented such that it intercepts all network traffic that is to be transmitted to node 718. In examples, such a configuration ensures that malicious actors attempting to infiltrate a network cannot bypass the data diodes implemented in each secure enclave. For this reason, enclave 704 and enclave 708 are configured in a manner to securely maintain (physically, via software means, or via other means) the executing code within each enclave (e.g., data diode 706 and data diode 708) in a tamper-proof and comprehensive manner in various implementations. By preventing the code of each enclave from being tampered with, each data diode may function uninterrupted and/or unaltered to intercept communications between nodes and ensure that data flows only in permissible manners.

In some implementations, enclave 704 and enclave 708 may comprise virtual machines executing on computing device 702. In some other implementations, enclave 704 and enclave 708 may utilize certain hardware that is separate from each other (e.g., different hardware processing units, different memory devices, different allocations of a same memory, etc.). In some other examples, enclaves may be implemented as a combination of software and/or hardware. An example of an enclave as described herein is Intel® Software Guard Extensions. In some implementations, each enclave is protected from external attacks, such as physical attacks (e.g., resulting from a physical intrusion) and/or electronic attacks (e.g., resulting from malicious communications to the enclave). Computing device 702 may comprise any suitable hardware for executing each enclave therein. In some embodiments, computing device 702 comprises a server device, such as a server that is co-located with one or nodes of a network as described herein. In some other embodiments, a plurality of computing device 702 are provided, each executing a plurality of enclaves to control the flow of communications between certain nodes. In some implementations, each enclave is pre-programmed to execute code in a manner that cannot be changed (e.g., other than by an administrator). As a result, data diodes executing with each enclave cannot be interfered with (e.g., by adverse parties), thereby further enhancing security.

In examples, enclave 704 and enclave 708 are each configured to control a directional transmission of data between a set of nodes (e.g., local to computing device 702). For instance, as shown in FIG. 7A, data diode 706 of enclave 704 is configured to control a directional transmission of data from node 716 to node 718. Similarly, data diode 710 of enclave 708 is configured to control a directional transmission of data from node 718 to node 716. For example, data diode ledgers 712 may indicate that node 716 may transmit data to node 718 (e.g., in a forward direction), but node 718 may not transmit data to node 716 (e.g., in a reverse direction). Data diode 706, in accordance with techniques described herein, therefore, may ensure that data communications from node 716 only flow in a single direction (i.e., in the forward direction), while preventing communications in the reverse direction. Conversely, data diode ledgers 714 may indicate that node 718 may transmit data to node 716, but node 716 may not transmit data to node 718. Using data diode ledgers 714, data diode 710, in accordance with the disclosed techniques, may ensure that communications flow from node 718 to node 716, but not vice versa.

By implementing separate data diodes as shown in FIG. 7A for each communication path (e.g., one data diode for forward communications and another data diode for reverse communications), the forward and reverse communication paths are able to be disjoined. Thus, even if a malicious entity were able to breach one secure enclave (e.g., enclave 704) that controls communications in one direction, such a breach would not allow the malicious entity to access the other enclave to inject or intercept communications in the other direction.

It should be understood that any number of nodes and/or enclaves may be present in implementations to control data transmissions therebetween. For instance, each enclave may control data transmissions in direction manner between a plurality of incoming nodes and/or a plurality of outgoing nodes (e.g., by utilizing an appropriate set of data diode ledgers for each such node to be managed). Further, computing device 702 may itself comprise a node from among a set of nodes. In other words, one or more enclaves (including data diodes therein) may be implemented within a node (e.g., within node 102B as described previously) in some implementations. In other implementations, computing device 702 may be arranged as a hardware device in between two other nodes (e.g., as an intermediary).

FIG. 7B shows an illustrative data diode ledger, in accordance with an example embodiment. In the illustration of FIG. 7B, an illustrative data diode ledger 720 is shown that comprises a plurality of rows and columns. As shown in FIG. 7B, data diode ledger 720 comprises a column 722 for a data diode identifier (ID), a column 724 for a start node, and a column 726 for an end node. Data diode ledger 720 may serve as a data diode ledger for a plurality of data diodes (e.g., a data diode implemented in an enclave as described earlier, or any other data diode described herein). Each row of data diode ledger 720 may indicate a particular flow (e.g., direction) of communication that is permissible between a pair of nodes. Data diode ledger 720 is intended to illustrate one way of arranging data diode information in a ledger, and is not intended to be limiting. Any number of diodes, nodes, etc. may be specified in data diode ledger 720, and data diode ledger 720 may contain additional (or less) information than that shown in FIG. 7B, in accordance with the disclosed techniques.

III. Example Mobile Device and Computer System Implementation

As noted herein, the embodiments described, along with any circuits, components and/or subcomponents thereof, as well as the flowcharts/flow diagrams described herein, including portions thereof, and/or other embodiments, may be implemented in hardware, or hardware with any combination of software and/or firmware, including being implemented as computer program code (program instructions) configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 8:
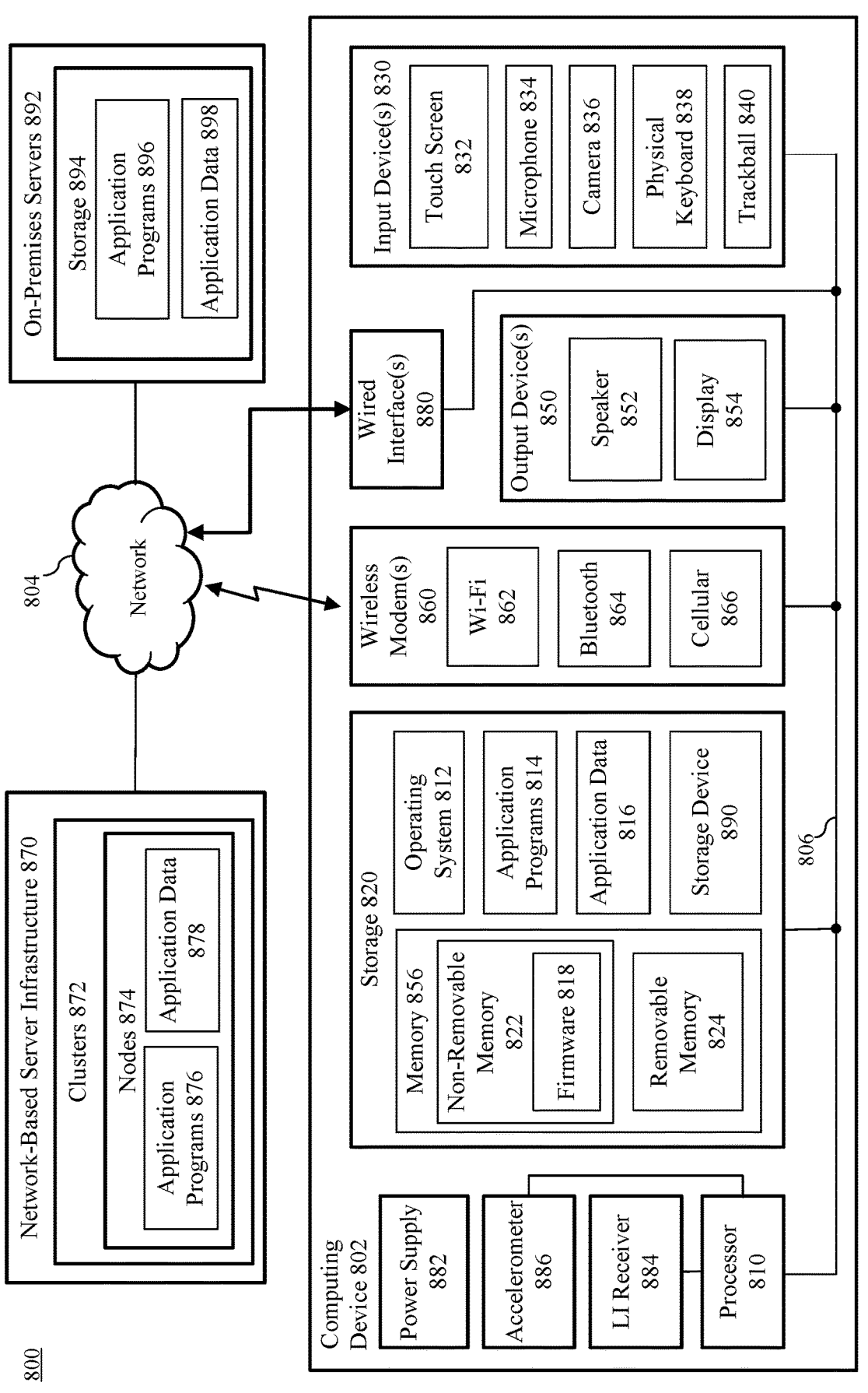
FIG. 8 shows a block diagram of an example computer system in which embodiments may be implemented.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 8. FIG. 8 shows a block diagram of an exemplary computing environment 800 that includes a computing device 802. Computing device 802 is an example of nodes 102A-102N, DB host 140, computing device 702, node 716, and/or node 718, which may include one or more of the components of computing device 802. In some embodiments, computing device 802 is communicatively coupled with devices (not shown in FIG. 8) external to computing environment 800 via network 804. Network 804 comprises one or more networks such as local area networks (LANs), wide area networks (WANs), enterprise networks, the Internet, etc., and may include one or more wired and/or wireless portions. Network 804 may additionally or alternatively include a cellular network for cellular communications. Computing device 802 is described in detail as follows.

Computing device 802 can be any of a variety of types of computing devices. For example, computing device 802 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Rift® of Facebook Technologies, LLC, etc.), or other type of mobile computing device. Computing device 802 may alternatively be a stationary computing device such as a desktop computer, a personal computer (PC), a stationary server device, a minicomputer, a mainframe, a supercomputer, etc.

As shown in FIG. 8, computing device 802 includes a variety of hardware and software components, including a processor 810, a storage 820, one or more input devices 830, one or more output devices 850, one or more wireless modems 860, one or more wired interfaces 880, a power supply 882, a location information (LI) receiver 884, and an accelerometer 886. Storage 820 includes memory 856, which includes non-removable memory 822 and removable memory 824, and a storage device 890. Storage 820 also stores an operating system 812, application programs 814, and application data 816. Wireless modem(s) 860 include a Wi-Fi modem 862, a Bluetooth modem 864, and a cellular modem 866. Output device(s) 850 includes a speaker 852 and a display 854. Input device(s) 830 includes a touch screen 832, a microphone 834, a camera 836, a physical keyboard 838, and a trackball 840. Not all components of computing device 802 shown in FIG. 8 are present in all embodiments, additional components not shown may be present, and any combination of the components may be present in a particular embodiment. These components of computing device 802 are described as follows.

A single processor 810 (e.g., central processing unit (CPU), microcontroller, a microprocessor, signal processor, ASIC (application specific integrated circuit), and/or other physical hardware processor circuit) or multiple processors 810 may be present in computing device 802 for performing such tasks as program execution, signal coding, data processing, input/output processing, power control, and/or other functions. Processor 810 may be a single-core or multi-core processor, and each processor core may be single-threaded or multithreaded (to provide multiple threads of execution concurrently). Processor 810 is configured to execute program code stored in a computer readable medium, such as program code of operating system 812 and application programs 814 stored in storage 820. The program code is structured to cause processor 810 to perform operations, including the processes/methods disclosed herein. Operating system 812 controls the allocation and usage of the components of computing device 802 and provides support for one or more application programs 814 (also referred to as "applications" or "apps"). Application programs 814 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 802 can communicate with any other component according to function, although not all connections are shown for ease of illustration. For instance, as shown in FIG. 8, bus 806 is a multiple signal line communication medium (e.g., conductive traces in silicon, metal traces along a motherboard, wires, etc.) that may be present to communicatively couple processor 810 to various other components of computing device 802, although in other embodiments, an alternative bus, further buses, and/or one or more individual signal lines may be present to communicatively couple components. Bus 806 represents one or more of any of several types of bus structures, including a memory bus or memory controller, a peripheral bus, an accelerated graphics port, and a processor or local bus using any of a variety of bus architectures.

Storage 820 is physical storage that includes one or both of memory 856 and storage device 890, which store operating system 812, application programs 814, and application data 816 according to any distribution. Non-removable memory 822 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 822 may include main memory and may be separate from or fabricated in a same integrated circuit as processor 810. As shown in FIG. 8, non-removable memory 822 stores firmware 818, which may be present to provide low-level control of hardware. Examples of firmware 818 include BIOS (Basic Input/Output System, such as on personal computers) and boot firmware (e.g., on smart phones). Removable memory 824 may be inserted into a receptacle of or otherwise coupled to computing device 802 and can be removed by a user from computing device 802. Removable memory 824 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 890 may be present that are internal and/or external to a housing of computing device 802 and may or may not be removable. Examples of storage device 890 include a hard disk drive, a SSD, a thumb drive (e.g., a USB (Universal Serial Bus) flash drive), or other physical storage device.

One or more programs may be stored in storage 820. Such programs include operating system 812, one or more application programs 814, and other program modules and program data. Examples of such application programs may include, for example, computer program logic (e.g., computer program code/instructions) for implementing one or more of data diode 104A-104N, ledger database 144, data decrypter 202, transmission validator 204, data encrypter 206, enclave 704, data diode 706, enclave 708, and/or data diode 710, along with any components and/or subcomponents thereof, as well as any other features illustrated and/or described herein, including portions thereof, and/or further examples described herein.

Storage 820 also stores data used and/or generated by operating system 812 and application programs 814 as application data 816. Examples of application data 816 include web pages, text, images, tables, sound files, video data, and other data, which may also be sent to and/or received from one or more network servers or other devices via one or more wired or wireless networks. Storage 820 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 802 through one or more input devices 830 and may receive information from computing device 802 through one or more output devices 850. Input device(s) 830 may include one or more of touch screen 832, microphone 834, camera 836, physical keyboard 838 and/or trackball 840 and output device(s) 850 may include one or more of speaker 852 and display 854. Each of input device(s) 830 and output device(s) 850 may be integral to computing device 802 (e.g., built into a housing of computing device 802) or external to computing device 802 (e.g., communicatively coupled wired or wirelessly to computing device 802 via wired interface(s) 880 and/or wireless modem(s) 860). Further input devices 830 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 854 may display information, as well as operating as touch screen 832 by receiving user commands and/or other information (e.g., by touch, finger gestures, virtual keyboard, etc.) as a user interface. Any number of each type of input device(s) 830 and output device(s) 850 may be present, including multiple microphones 834, multiple cameras 836, multiple speakers 852, and/or multiple displays 854.

One or more wireless modems 860 can be coupled to antenna(s) (not shown) of computing device 802 and can support two-way communications between processor 810 and devices external to computing device 802 through network 804, as would be understood to persons skilled in the relevant art(s). Wireless modem 860 is shown generically and can include a cellular modem 866 for communicating with one or more cellular networks, such as a GSM network for data and voice communications within a single cellular network, between cellular networks, or between the mobile device and a public switched telephone network (PSTN). Wireless modem 860 may also or alternatively include other radio-based modem types, such as a Bluetooth modem 864 (also referred to as a "Bluetooth device") and/or Wi-Fi modem 862 (also referred to as an "wireless adaptor"). Wi-Fi modem 862 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 864 is configured to communicate with another Bluetooth-capable device according to the Bluetooth short-range wireless technology standard(s) such as IEEE 802.15.1 and/or managed by the Bluetooth Special Interest Group (SIG).

Computing device 802 can further include power supply 882, LI receiver 884, accelerometer 886, and/or one or more wired interfaces 880. Example wired interfaces 880 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 880 of computing device 802 provide for wired connections between computing device 802 and network 804, or between computing device 802 and one or more devices/peripherals when such devices/peripherals are external to computing device 802 (e.g., a pointing device, display 854, speaker 852, camera 836, physical keyboard 838, etc.). Power supply 882 is configured to supply power to each of the components of computing device 802 and may receive power from a battery internal to computing device 802, and/or from a power cord plugged into a power port of computing device 802 (e.g., a USB port, an A/C power port). LI receiver 884 may be used for location determination of computing device 802 and may include a satellite navigation receiver such as a Global Positioning System (GPS) receiver or may include other type of location determiner configured to determine location of computing device 802 based on received information (e.g., using cell tower triangulation, etc.). Accelerometer 886 may be present to determine an orientation of computing device 802.

Note that the illustrated components of computing device 802 are not required or all-inclusive, and fewer or greater numbers of components may be present as would be recognized by one skilled in the art. For example, computing device 802 may also include one or more of a gyroscope, barometer, proximity sensor, ambient light sensor, digital compass, etc. Processor 810 and memory 856 may be co-located in a same semiconductor device package, such as being included together in an integrated circuit chip, FPGA, or system-on-chip (SOC), optionally along with further components of computing device 802.

In embodiments, computing device 802 is configured to implement any of the above-described features of flowcharts herein. Computer program logic for performing any of the operations, steps, and/or functions described herein may be stored in storage 820 and executed by processor 810.

In some embodiments, server infrastructure 870 may be present in computing environment 800 and may be communicatively coupled with computing device 802 via network 804. Server infrastructure 870, when present, may be a network-accessible server set (e.g., a cloud-based environment or platform). As shown in FIG. 8, server infrastructure 870 includes clusters 872. Each of clusters 872 may comprise a group of one or more compute nodes and/or a group of one or more storage nodes. For example, as shown in FIG. 8, cluster 872 includes nodes 874. Each of nodes 874 are accessible via network 804 (e.g., in a "cloud-based" embodiment) to build, deploy, and manage applications and services. Any of nodes 874 may be a storage node that comprises a plurality of physical storage disks, SSDs, and/or other physical storage devices that are accessible via network 804 and are configured to store data associated with the applications and services managed by nodes 874. For example, as shown in FIG. 8, node 874 may store application data 878.

Each of nodes 874 may, as a compute node, comprise one or more server computers, server systems, and/or computing devices. For instance, a node 874 may include one or more of the components of computing device 802 disclosed herein. Each of nodes 874 may be configured to execute one or more software applications (or "applications") and/or services and/or manage hardware resources (e.g., processors, memory, etc.), which may be utilized by users (e.g., customers) of the network-accessible server set. For example, as shown in FIG. 8, nodes 874 may operate application programs 876. In an implementation, a node of nodes 874 may operate or comprise one or more virtual machines, with each virtual machine emulating a system architecture (e.g., an operating system), in an isolated manner, upon which applications such as application programs 876 may be executed.

In an embodiment, one or more of clusters 872 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 872 may be a datacenter in a distributed collection of datacenters. In embodiments, exemplary computing environment 800 comprises part of a cloud-based platform such as Amazon Web Services® of Amazon Web Services, Inc., or Google Cloud Platform™ of Google LLC, although these are only examples and are not intended to be limiting.

In an embodiment, computing device 802 may access application programs 876 for execution in any manner, such as by a client application and/or a browser at computing device 802. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 802 may additionally and/or alternatively synchronize copies of application programs 814 and/or application data 816 to be stored at network-based server infrastructure 870 as application programs 876 and/or application data 878. For instance, operating system 812 and/or application programs 814 may include a file hosting service client, such as Microsoft® OneDrive® by Microsoft Corporation, Amazon Simple Storage Service (Amazon S3)® by Amazon Web Services, Inc., Dropbox® by Dropbox, Inc., Google Drive™ by Google LLC, etc., configured to synchronize applications and/or data stored in storage 820 at network-based server infrastructure 870.

In some embodiments, on-premises servers 892 may be present in computing environment 800 and may be communicatively coupled with computing device 802 via network 804. On-premises servers 892, when present, are hosted within an organization's infrastructure and, in many cases, physically onsite of a facility of that organization. On-premises servers 892 are controlled, administered, and maintained by IT (Information Technology) personnel of the organization or an IT partner to the organization. Application data 898 may be shared by on-premises servers 892 between computing devices of the organization, including computing device 802 (when part of an organization)

through a local network of the organization, and/or through further networks accessible to the organization (including the Internet). Furthermore, on-premises servers 892 may serve applications such as application programs 896 to the computing devices of the organization, including computing device 802. Accordingly, on-premises servers 892 may include storage 894 (which includes one or more physical storage devices such as storage disks and/or SSDs) for storage of application programs 896 and application data 898 and may include one or more processors for execution of application programs 896. Still further, computing device 802 may be configured to synchronize copies of application programs 814 and/or application data 816 for backup storage at on-premises servers 892 as application programs 896 and/or application data 898.

Embodiments described herein may be implemented in one or more of computing device 802, network-based server infrastructure 870, and on-premises servers 892. For example, in some embodiments, computing device 802 may be used to implement systems, clients, or devices, or components/subcomponents thereof, disclosed elsewhere herein. In other embodiments, a combination of computing device 802, network-based server infrastructure 870, and/or on-premises servers 892 may be used to implement the systems, clients, or devices, or components/subcomponents thereof, disclosed elsewhere herein.

As used herein, the terms "computer program medium," "computer-readable medium," and "computer-readable storage medium," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 820. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 814) may be stored in storage 820. Such computer programs may also be received via wired interface(s) 880 and/or wireless modem(s) 860 over network 804. Such computer programs, when executed or loaded by an application, enable computing device 802 to implement features of embodiments discussed herein. Accordingly, such computer programs represent controllers of the computing device 802.

Embodiments are also directed to computer program products comprising computer code or instructions stored on any computer-readable medium or computer-readable storage medium. Such computer program products include the physical storage of storage 820 as well as further physical storage types.

IV. Additional Example Embodiments

A data diode system is disclosed herein. The system includes: a processor; and a memory device that stores program code structured to cause the processor to: receive encrypted data transmitted from a first node, the data encrypted with a public key associated with a second node; decrypt the encrypted data with a private key associated with the second node to generate decrypted data; determine if a digital signature in the decrypted data corresponds to an entry mapped to the first node in a first set of ledger entries; verify that the first node is a trusted entity based on the digital signature having been determined to correspond to the entry; and based on the verification, determine that the transmission of the encrypted data from the first node is a permissible data transmission.

In one implementation of the foregoing system, the first set of ledger entries is implemented in a tamper-evident ledger.

In another implementation of the foregoing system, the first set of ledger entries is signed with a signing key associated with an administrative entity, and the program code is further structured to cause the processor to verify that the first set of ledger entries is trusted based on the signing key.

In another implementation of the foregoing system, the program code is further structured to cause the processor to: encrypt the data with a public key associated with a third node, the public key associated with the third node identified from a second set of ledger entries that identifies at least one node to which the second node can securely transmit data; transmit the data encrypted with the public key associated with the third node to the third node.

In another implementation of the foregoing system, the program code is executed in a secure enclave of a computing device, the computing device comprising a plurality of secure enclaves that are isolated from each other.

In another implementation of the foregoing system, each secure enclave of the computing device controls a directional transmission of data between a set of nodes local to the computing device.

In another implementation of the foregoing system, the program code is further structured to cause the processor to: receive, from the administrative entity, an update to the first set of ledger entries that includes at least one of an addition or removal of a node in a listing of nodes.

A method is disclosed herein. The method includes: receiving encrypted data transmitted from a first node, the data encrypted with a public key associated with a second node; decrypting the encrypted data with a private key associated with the second node to generate decrypted data; determining if a digital signature in the decrypted data corresponds to an entry mapped to the first node in a first set of ledger entries; verifying that the first node is a trusted entity based on the digital signature having been determined to correspond to the entry; and based on the verification, determining that the transmission of the encrypted data from the first node is a permissible data transmission.

In one implementation of the foregoing method, the first set of ledger entries is implemented in a tamper-evident ledger.

In another implementation of the foregoing method, the first set of ledger entries is signed with a signing key associated with an administrative entity, and the method further comprises verifying that the first set of ledger entries is trusted based on the signing key.

In another implementation of the foregoing method, the method further comprises: encrypting the data with a public key associated with a third node, the public key associated with the third node identified from a second set of ledger entries that identifies at least one node to which the second node can securely transmit data; and transmitting the data encrypted with the public key associated with the third node to the third node.

In another implementation of the foregoing method, the method is executed in a secure enclave of a computing device, the computing device comprising a plurality of secure enclaves that are isolated from each other.

In another implementation of the foregoing method, each secure enclave of the computing device controls a directional transmission of data between a set of nodes local to the computing device.

In another implementation of the foregoing method, the method further comprises: receiving, from the administrative entity, an update to the first set of ledger entries that includes at least one of an addition or removal of a node in a listing of nodes.

A computer-readable storage medium is disclosed herein. The computer-readable storage medium has computer program code recorded thereon that when executed by at least one processor causes the at least one processor to perform a method comprising: receiving encrypted data transmitted from a first node, the data encrypted with a public key associated with a second node; decrypting the encrypted data with a private key associated with the second node to generate decrypted data; determining if a digital signature in the decrypted data corresponds to an entry mapped to the first node in a first set of ledger entries; verifying that the first node is a trusted entity based on the digital signature having been determined to correspond to the entry; and based on the verification, determining that the transmission of the encrypted data from the first node is a permissible data transmission.

In one implementation of the foregoing computer-readable storage medium, the first set of ledger entries is implemented in a tamper-evident ledger.

In another implementation of the foregoing computer-readable storage medium, the first set of ledger entries is signed with a signing key associated with an administrative entity, and the method further comprises verifying that the first set of ledger entries is trusted based on the signing key.

In another implementation of the foregoing computer-readable storage medium, the method further comprises: encrypting the data with a public key associated with a third node, the public key associated with the third node identified from a second set of ledger entries that identifies at least one node to which the second node can securely transmit data; and transmitting the data encrypted with the public key associated with the third node to the third node.

In another implementation of the foregoing computer-readable storage medium, the method is executed in a secure enclave of a computing device, the computing device comprising a plurality of secure enclaves that are isolated from each other.

In another implementation of the foregoing computer-readable storage medium, each secure enclave of the computing device controls a directional transmission of data between a set of nodes local to the computing device.

V. CONCLUSION

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Furthermore, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

While various embodiments of the present disclosure have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the claimed embodiments should not be limited by any of the above-described exemplary embodiments, but should be defined only in accordance with the following claims and their equivalents.

What is claimed is:

1. A data diode system, comprising:
   a processor; and
   a memory device that stores program code structured to cause the processor to:
   receive a transmission of an encrypted data from a first node, the data encrypted with a public key associated with a second node;
   decrypt the encrypted data with a private key associated with the second node to generate decrypted data;
   verify that the first node is a trusted entity based on a determination that a digital signature in the decrypted data corresponds to a public signing key in a first ledger entry mapped to the first node in a first set of ledger entries;
   determine that the first node corresponds to a second ledger entry in a second set of ledger entries that identifies at least one node from which the second node is permitted to receive data; and
   determine that the transmission of the encrypted data from the first node is a permissible data transmission based on verifying that the first node is a trusted entity and determining that the first node corresponds to the second ledger entry in the second set of ledger entries.

2. The system of claim 1, wherein the first set of ledger entries is implemented in a tamper-evident ledger.

3. The system of claim 2, wherein the first set of ledger entries is signed with a signing key associated with an administrative entity, and wherein the program code is further structured to cause the processor to verify that the first set of ledger entries is trusted based on the signing key.

4. The system of claim 1, wherein the program code is further structured to cause the processor to:
   encrypt the data with a public key associated with a third node, the public key associated with the third node identified from a third set of ledger entries that identifies at least one node to which the second node is permitted to securely transmit data; and
   transmit the data encrypted with the public key associated with the third node to the third node.

5. The system of claim 1, wherein the program code is executed in a secure enclave of a computing device, the computing device comprising a plurality of secure enclaves that are isolated from each other.

6. The system of claim 5, wherein each secure enclave of the computing device controls a directional transmission of data between a set of nodes local to the computing device.

7. The system of claim 3, wherein the program code is further structured to cause the processor to:
   receive, from the administrative entity, an update to the first set of ledger entries that includes at least one of an addition or removal of a node in a listing of nodes.

8. A method, comprising:
   receiving a transmission of an encrypted data from a first node, the data encrypted with a public key associated with a second node;
   decrypting the encrypted data with a private key associated with the second node to generate decrypted data;
   verifying that the first node is a trusted entity based on a determination that a digital signature in the decrypted data corresponds to a public signing key in a first ledger entry mapped to the first node in a first set of ledger entries;
   determining that the first node corresponds to a second ledger entry in a second set of ledger entries that identifies at least one node from which the second node is permitted to receive data; and
   determining that the transmission of the encrypted data from the first node is a permissible data transmission based on verifying that the first node is a trusted entity and determining that the first node corresponds to the second ledger entry in the second set of ledger entries.

9. The method of claim 8, wherein the first set of ledger entries is implemented in a tamper-evident ledger.

10. The method of claim 9, wherein the first set of ledger entries is signed with a signing key associated with an administrative entity, and
    wherein the method further comprises verifying that the first set of ledger entries is trusted based on the signing key.

11. The method of claim 8, further comprising:
    encrypting the data with a public key associated with a third node, the public key associated with the third node identified from a third set of ledger entries that identifies at least one node to which the second node is permitted to securely transmit data; and
    transmitting the data encrypted with the public key associated with the third node to the third node.

12. The method of claim 8, wherein the method is executed in a secure enclave of a computing device, the computing device comprising a plurality of secure enclaves that are isolated from each other.

13. The method of claim 12, wherein each secure enclave of the computing device controls a directional transmission of data between a set of nodes local to the computing device.

14. The method of claim 10, further comprising:

receiving, from the administrative entity, an update to the first set of ledger entries that includes at least one of an addition or removal of a node in a listing of nodes.

15. A computer-readable storage medium having computer program code recorded thereon that when executed by at least one processor causes the at least one processor to perform a method comprising:

receiving a transmission of an encrypted data from a first node, the data encrypted with a public key associated with a second node;

decrypting the encrypted data with a private key associated with the second node to generate decrypted data;

verifying that the first node is a trusted entity based on a determination that a digital signature in the decrypted data corresponds to a public signing key in a first ledger entry mapped to the first node in a first set of ledger entries;

determining that the first node corresponds to a second ledger entry in a second set of ledger entries that identifies at least one node from which the second node is permitted to receive data; and determining that the transmission of the encrypted data from the first node is a permissible data transmission based on verifying that the first node is a trusted entity and determining that the first node corresponds to the second ledger entry in the second set of ledger entries.

16. The computer-readable storage medium of claim 15, wherein the first set of ledger entries is implemented in a tamper-evident ledger.

17. The computer-readable storage medium of claim 16, wherein the first set of ledger entries is signed with a signing key associated with an administrative entity, and wherein the method further comprises verifying that the first set of ledger entries is trusted based on the signing key.

18. The computer-readable storage medium of claim 15, wherein the method further comprises:

encrypting the data with a public key associated with a third node, the public key associated with the third node identified from a third set of ledger entries that identifies at least one node to which the second node is permitted to securely transmit data; and transmitting the data encrypted with the public key associated with the third node to the third node.

19. The computer-readable storage medium of claim 15, wherein the method is executed in a secure enclave of a computing device, the computing device comprising a plurality of secure enclaves that are isolated from each other.

20. The computer-readable storage medium of claim 19, wherein each secure enclave of the computing device controls a directional transmission of data between a set of nodes local to the computing device.

* * * * *